April 4, 1950
M. W. COLEMAN
2,502,640
FIXTURE FOR PORTABLE POWER-DRIVEN TOOLS
Filed Nov. 19, 1945
4 Sheets-Sheet 1
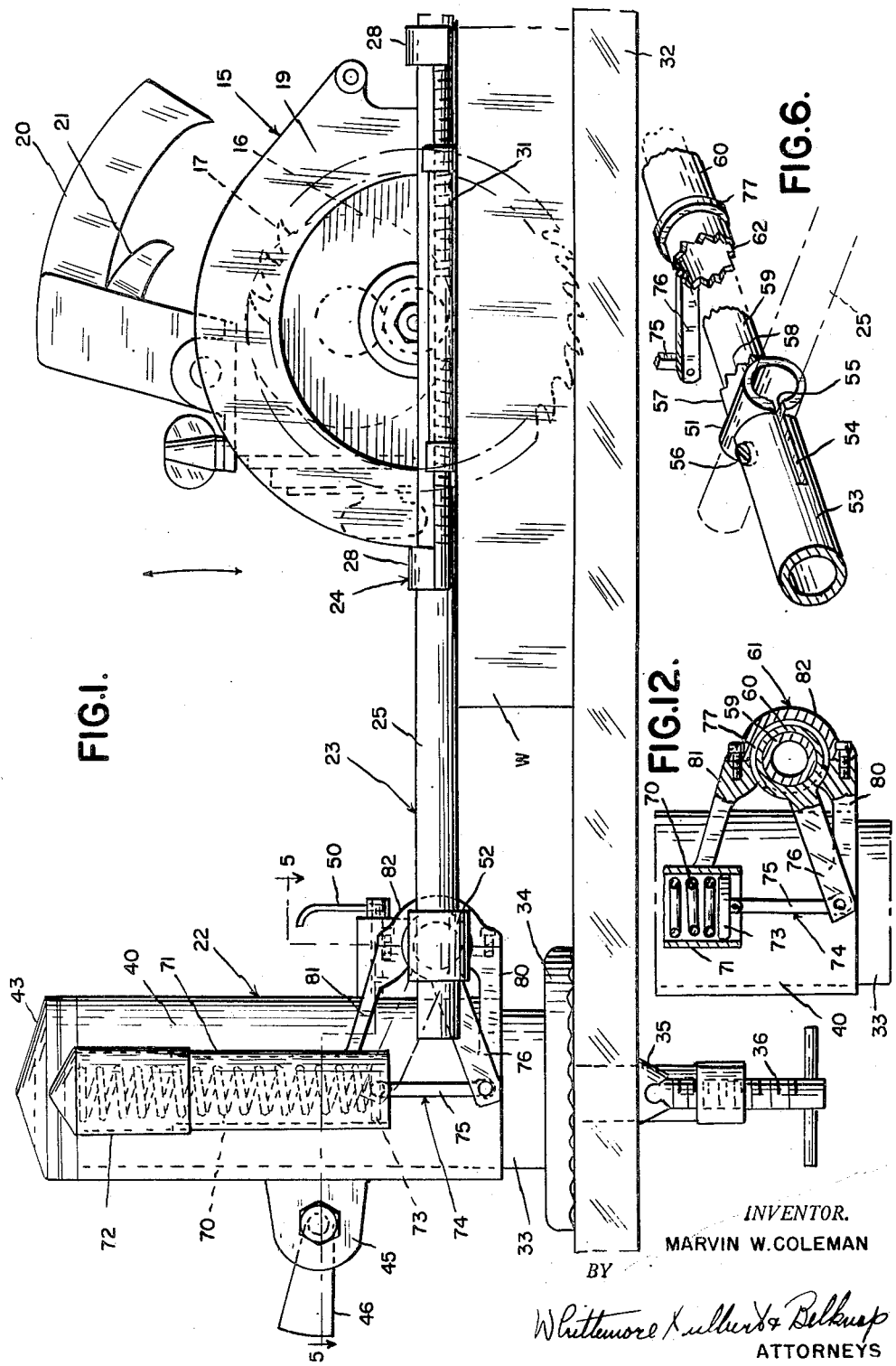
INVENTOR.
MARVIN W. COLEMAN
BY
Whittemore Hulbert & Belknap
ATTORNEYS

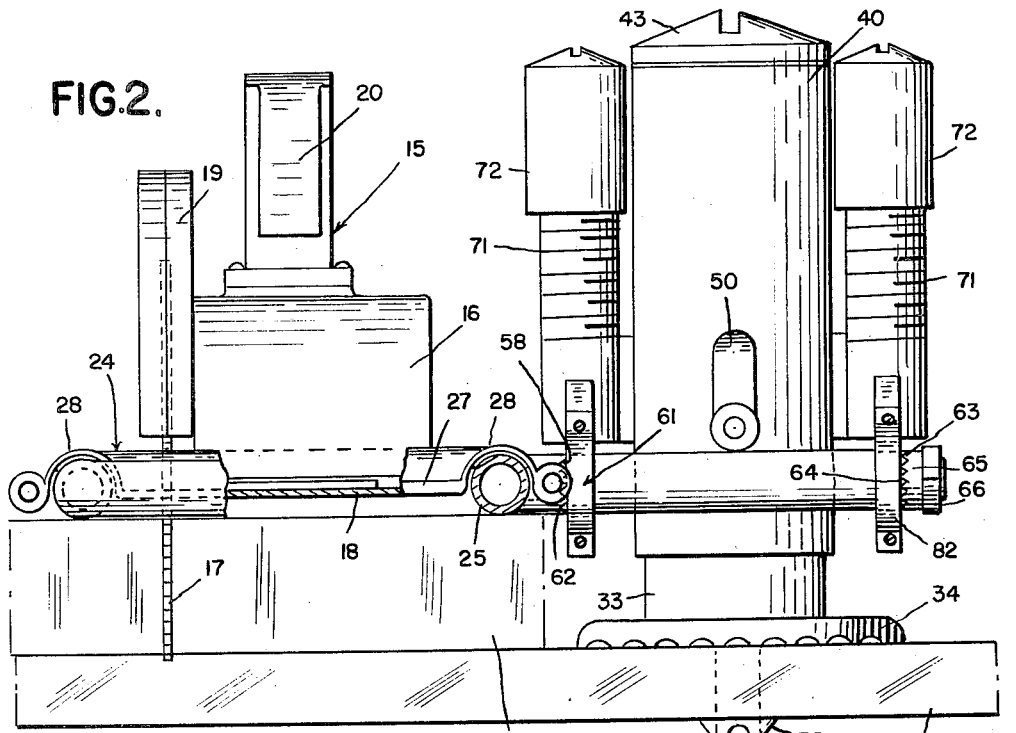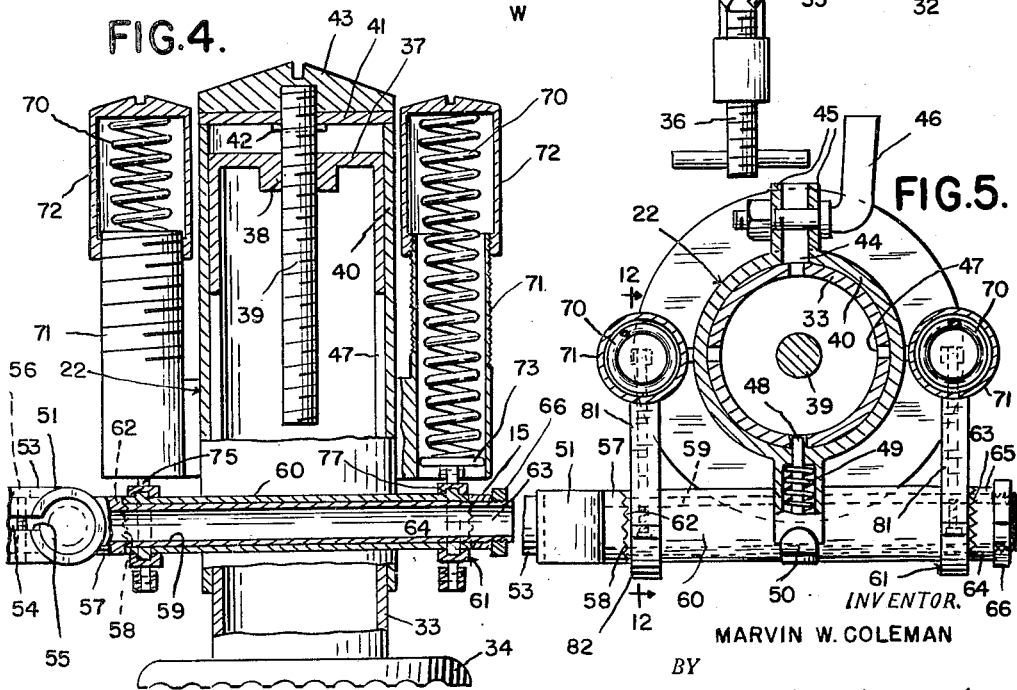

April 4, 1950  M. W. COLEMAN  2,502,640
FIXTURE FOR PORTABLE POWER-DRIVEN TOOLS
Filed Nov. 19, 1945  4 Sheets-Sheet 3
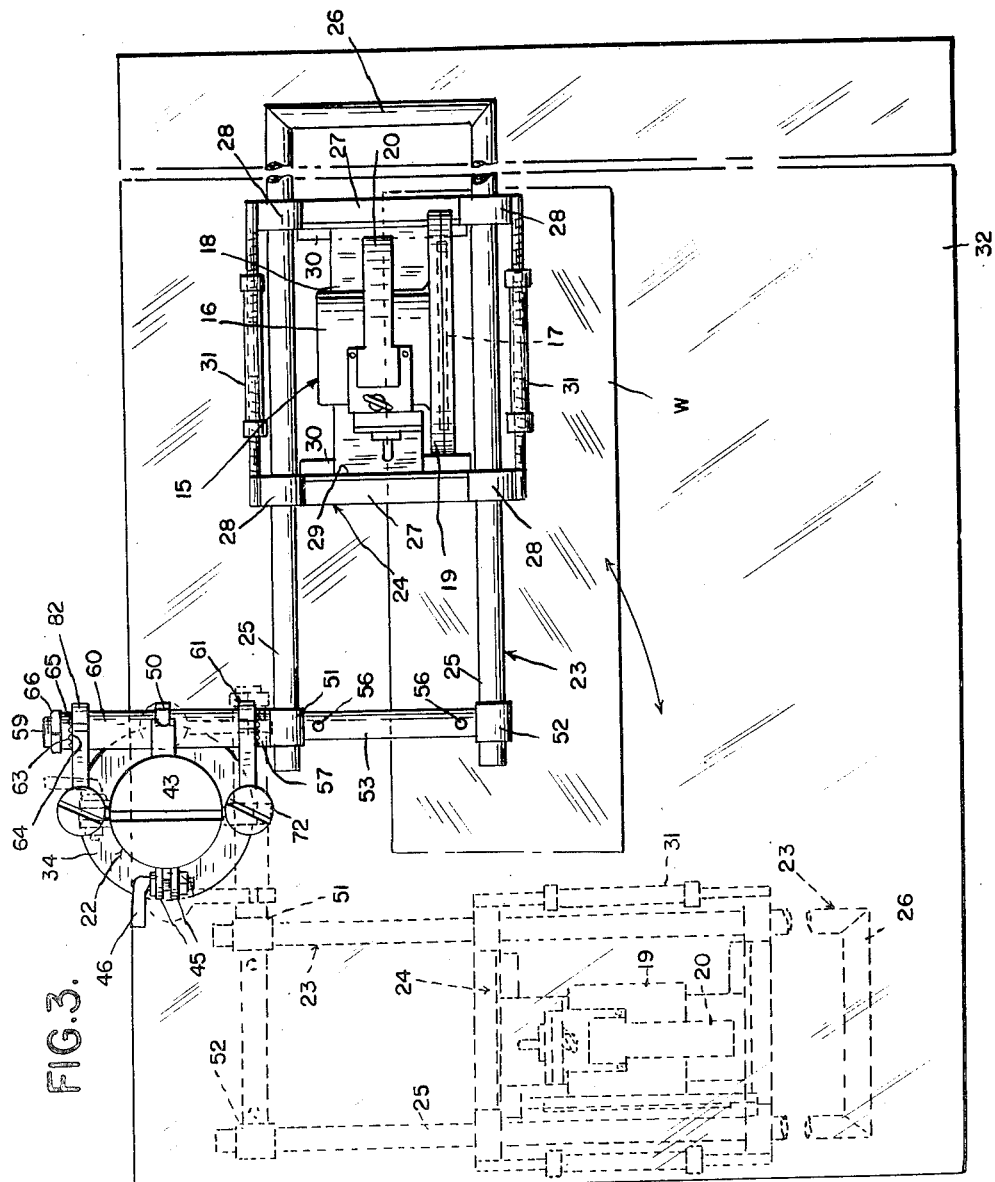
INVENTOR
MARVIN W. COLEMAN
ATTORNEYS April 4, 1950 M. W. COLEMAN 2,502,640
FIXTURE FOR PORTABLE POWER-DRIVEN TOOLS
Filed Nov. 19, 1945 4 Sheets-Sheet 4
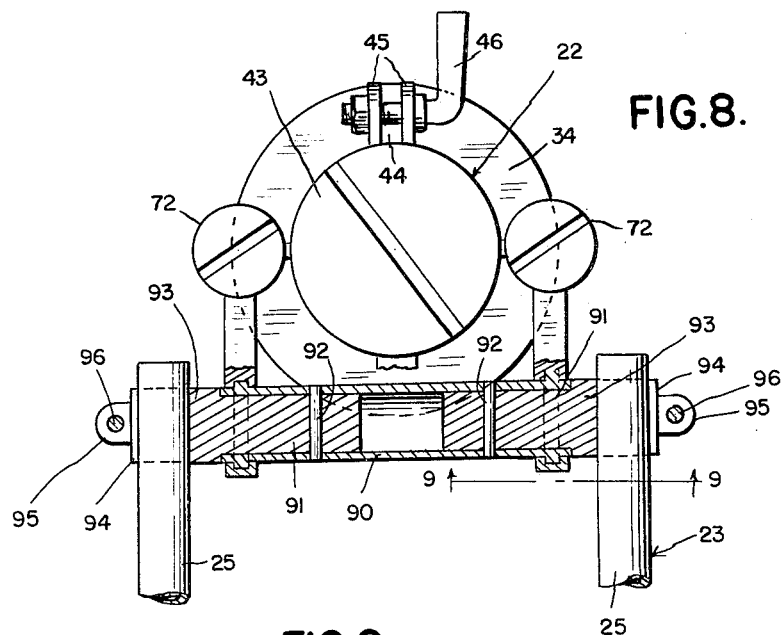
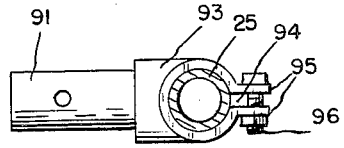
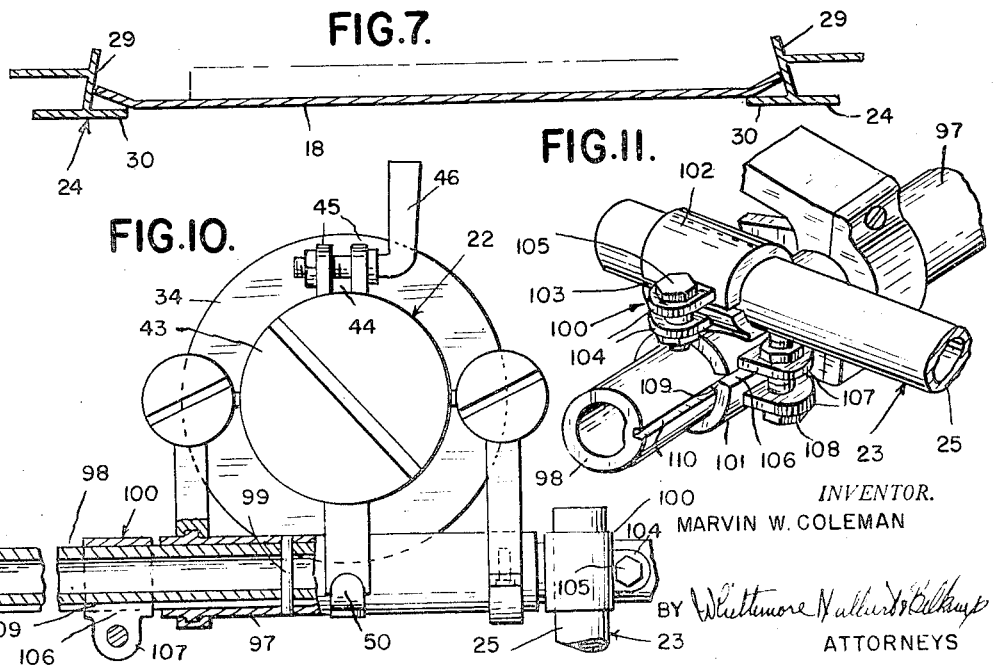
INVENTOR.
MARVIN W. COLEMAN
ATTORNEYS Patented Apr. 4, 1950

2,502,640

UNITED STATES PATENT OFFICE 2,502,640

FIXTURE FOR PORTABLE POWER-DRIVEN TOOLS

Marvin W. Coleman, Detroit, Mich.

Application November 19, 1945, Serial No. 629,515

10 Claims. (Cl. 143—6)

This invention relates generally to fixtures for manipulating power driven tools and refers more particularly to improvements in fixtures of the type used in connection with power driven circular saws.

Various different types of portable power driven tools are available to the trade and it is an object of this invention to not only greatly increase the possible uses of such tools, but at the same time, enable the tools to be handled with greater facility.

While the invention is not restricted to the use of any specific type of tool, nevertheless, it finds particular utility when employed for the purpose of manipulating portable saw units of the type having a circular saw and a relatively high speed motor for operating the saw. With this in view, the invention has as another object the provision of a fixture having a track pivotally supported at one end for swinging movement and having a carriage for the saw unit slidably mounted on the track. Thus, the track provides an arm along which the saw on the carriage may be moved back and forth or may be swung about the axis of the pivoted mounting for the track.

A further object of this invention is to provide a mounting for the arm or track which enables positioning the latter over a suitable work supporting surface and which includes means for counterbalancing the weight of the carriage as well as the saw unit on the carriage. Thus, the track or arm may be readily swung toward the supporting surface to position the work on the latter while the saw carriage is advanced to saw the work and may be quickly raised with very little effort to enable retracting the saw carriage. It follows from the above that the arm may be operated with an oscillating motion to successively saw the work with the minimum amount of effort and in the shortest possible time.

Still another object of this invention is to provide a mounting for the fixture which enables adjusting the arm or track to any one of a number of offset positions relative to the fixture supporting bracket and which also permits holding the work in position by the arm or track in any one of the above adjusted positions. Thus, the saw may be used to rip, cross cut, shape, slot, or rout the work.

A still further object of this invention is to provide a mounting for the fixture which enables adjusting the arm or track throughout a complete circle in a horizontal plane in any one of the offset positions previously noted. As a result, the saw may be employed to accurately cut at predetermined angles with respect to the work and this is of great importance in cases where it is necessary to miter the work.

Still another feature of this invention is to provide a fixture of the above type having means for readily adjusting the elevation of the track or arms to enable sawing work of widely varying thicknesses.

The foregoing as well as other objects will be made more apparent as this description proceeds, especially when considered in connection with the accompanying drawings, wherein:

Figure 1 is a fragmentary side elevational view of a fixture embodying the features of this invention and having a portable power driven saw unit thereon;

Figure 2 is an end elevational view of the fixture shown in Figure 1;

Figure 3 is a plan view showing two of the several possible positions of the fixture;

Figure 4 is a fragmentary sectional view through a part of the fixture shown in Figure 1;

Figure 5 is a sectional view taken substantially on the line 5—5 of Figure 1;

Figure 6 is a fragmentary perspective view of a part of the fixture;

Figure 7 is a sectional view showing part of the saw carriage;

Figure 8 is a top plan view partly in section of a lightly modified construction;

Figure 9 is a sectional view taken on the line 9—9 of Figure 8;

Figure 10 is a plan view partly in section of another modified construction;

Figure 11 is a fragmentary perspective view of a part of the construction shown in Figure 10;

Figure 12 is a sectional view taken substantially on the line 12—12 of Figure 5.

For the purpose of illustrating this invention, I have shown the fixture as employed to manipulate a portable power driven circular saw indicated generally in several of the figures of the drawings by the reference character 15. There are various different types of portable power driven circular saw units available to the trade, but in practically all instances, the general construction of the saw units is the same. Briefly, the saw unit 15 comprises an electric motor 16 and a circular or disc saw 17 suitably fixed to the drive shaft of the motor. The motor 16 is suitably secured to a base plate 18 and the upper portion of the saw 17 is enclosed in accordance with conventional practice by a pivoted guard 19. The saw unit is normally manipulated by a handle 20 suitably secured to the top of the motor and having a trigger operated switch 21 for controlling the operation of the motor 16. These saw assemblies are usually provided with a protractor which enables adjusting the angle of the saw relative to the base.

In the present instance, the saw unit 15 is operated through a fixture comprising a mounting device 22, a track or arm 23 and a carriage 24. The track or arm 23 comprises laterally spaced tubular guide rails 25 extending parallel to one another in a horizontal plane and having the outer ends integrally connected by means of a transverse tubular bar 26 (Fig. 3) which forms a handle for the track or frame 23.

The carriage 24 rests on the top portions of the rails 25 and is slidable in opposite directions along the rails 25. In detail, the carriage 24 comprises a pair of cross members 27 spaced from each other longitudinally of the track 23 and having semi-circular portions 28 at the extremities respectively slidably receiving the top portions of the tubular side rails 25. Upon reference to Figure 7 of the drawings, it will be noted that the portions of the cross members between the semi-circular extremities 28 are provided with upwardly extending flanges 29 and are also formed with flanges 30 which project inwardly from the bottom edges of the flanges 29. The base flanges 30 form seats for the opposite end portions of the supporting plate 18 on the saw unit and the flanges 29 taper inwardly to prevent accidental disengagement of the plate 18 from the carriage or cross members 27. As shown particularly in Figures 1 and 3 of the drawings, the opposite ends of the cross members 27 are respectively connected by adjustable links 31. The links 31 enable readily clamping the base plate 18 between the cross members 27 and enable varying the distance between the latter members to accommodate base plates 18 of different length.

It is important to note at this time that the carriage 24 merely rests on the top of the tubular rails 25 and that no part of the carriage projects below the rails 25. The above is important, because it enables resting the bottom portions of the rails directly on the top surface of the work to be sawed without interfering with movement of the carriage along the top portions of the rails. In this connection, attention is directed to Figure 1 of the drawings, wherein it will be noted that a work piece W is held in position on the top surface of a bench or other suitable support 32 by pressure exerted on the work through the track or arm 23 of the fixture.

The clamping device 22 comprises a vertical post 33 having a base portion 34 engageable with the top surface of the support 32 and having an abutment 35 engageable with the bottom surface of the support 32. The abutment 35 is adjustable by a threaded spindle 36 and cooperates with the base 34 to secure the post 33 on the support 32. As shown in Figure 4 of the drawings, the post 33 is in the form of a tube having the upper end closed by a wall 37 and having a central enlargement 38 on the wall 37. The enlargement 38 is formed with a central bore therethrough, which is threaded to receive a stud 39 having the upper end projecting beyond the wall 37. A sleeve 40 is rotatably supported on the post 33 and the upper end of the sleeve is closed by a wall 41. The wall 41 is centrally apertured to receive the upper end of the stud 39 and rests on a stop 42 secured to the stud 39. A suitable cap 43 is threaded on the extreme upper end of the stud and cooperates with the stop 42 to hold the sleeve against vertical displacement relative to the post 33. The above construction enables adjusting the sleeve 40 axially of the post 33 and permits varying the elevation of the track or arm 23 to compensate for work of varying thicknesses. As shown in Figure 5 of the drawings, the sleeve 40 is formed with an elongated slot 44 which extends upwardly from the bottom of the sleeve and has a width sufficient to enable the sleeve to grip the post 33 with sufficient force to hold the sleeve against rotation relative to the post. It will also be noted from Figure 5 of the drawings that a pair of ears 45 are respectively secured to the sleeve at opposite sides of the slot 44 and these ears are formed with aligned openings therethrough for receiving a clamping screw 46. Thus, by manipulating the clamping screw 46, the sleeve 40 may either be clamped to the post 33 or may be released from the latter sufficiently to enable rotation of the sleeve around the post.

As will be more fully hereinafter described, the inner end of the track or arm 23 is secured to the sleeve 40 for rotation as a unit with the latter. As a result, the track 23, with the carriage 24 thereon, may be readily adjusted relative to the supporting surface 32 throughout 360° around the axis of the post 33. Thus, the work W may be sawed at practically any desired angle by merely rotatably adjusting the sleeve 40 relative to the post 33. In Figure 3 of the drawings, two possible positions of the track or arm 23 are indicated. In the full line position of the arm 23, the saw 17 may be used to rip and in the dotted line position of the arm, the saw may be used to cut the work crosswise. If desired, the track or arm 23 may be quickly positioned to different predetermined locations about the post 33 by forming slots 47 in the post and by engaging the slots with a spring pressed detent 48 carried by the sleeve 40. As shown in Figure 5 of the drawings, the slots 47 are spaced equal distances from each other circumferentially of the post 33 and the detent 48 is normally urged into engagement with the slots by means of a spring 49. As stated above, the detent 48 is carried by the rotatable sleeve 40 and may be withdrawn from engagement with an adjacent slot by manipulation of a suitable handle 50 located for convenient operation.

Referring now more in detail to the connection between the arm or truck track 23 and the clamping device 22, it will be noted that the inner ends of the rails 25 are respectively engaged in sleeves 51 and 52. The sleeves are integrally connected by means of a tubular shaft 53 having diametrically opposed slots 54 extending inwardly from opposite ends and registering with longitudinally extending slots 55 formed in the sleeves. The sleeves are clamped into engagement with the respective rails 25 by means of studs 56 threadedly supported on opposite ends of the shaft 53 and arranged in cooperation with the slots 54, 55 to clamp the sleeves to the respective rails 25. It will be noted from Figures 3, 5 and 6 that the sleeve 51 is provided with a tubular projection 57 positioned opposite the shaft 53 in alignment with the latter and formed with teeth 58. A tubular shaft 59 is secured in the projection 57 and is rotatably supported in a tubular shaft 60. The tubular shaft 60 extends transversely of the post in bearings 61 carried by the rotatable sleeve 40. One end of the outer tubular shaft 60 is provided with teeth 62 adapted to mesh with the teeth 58 and the opposite end of the shaft 60 is formed with similar teeth 63 which mesh with corresponding teeth 64 on a spacer 65. The spacer 65 is supported on the adjacent end of the inner shaft 59 and a nut 66 is threaded on the latter end of the shaft 59 beyond the spacer 55 to hold the parts in the assembled relationship shown in Figure 4 of the drawings.

It follows from the above that the track or arm 23 is mounted on the rotatable sleeve 40 for swinging movement above an axis perpendicular to the axis of rotation of the sleeve 40. It is also pointed out at this time that the above mounting is such as to enable changing the position of the arm 23 from the location shown in Figure 3 of the drawings to a position at the opposite side of the clamping device 22. This may be accomplished by detaching the nut 66 as well as the spacer 65 from the end of the shaft 59. The shaft 59 may then be removed from the shaft 60 and reassembled with the latter through the opposite end of the same. As a result, the arm or track 23 assumes a position at the side of the clamping device 22 opposite the side shown in Figure 3 of the drawings. In this latter position, the arm is located beyond the adjacent edge of the support 32 and may be rotated about the axis of the shaft 60 throughout 360°. This particular feature may be desirable in cases where a routing tool assembly is used in lieu of the saw unit 15.

The weight of the track or arm 23 as well as the weight of the carriage 24 and saw unit 15 is counterbalanced by a pair of springs 70 positioned at diametrically opposite sides of the sleeves 40. As shown particularly in Figure 4 of the drawings, each of the springs 70 is housed in a tube or retainer 71 exteriorly threaded for engagement with the lower end of a tubular cap 72. The retainers 71 are permanently secured to diametrically opposite sides of the sleeve 40 by any suitable means such, for example, as welding or brazing. The upper ends of the springs respectively engage the adjustable caps 72 and the lower ends of the springs respectively engage plungers 73. The plungers are slidably supported in the retainers 71 and are connected to opposite end portions of the shaft 60 by linkage 74 (Figures 1 and 12). The linkage 74 for each plunger 73 comprises a rod 75 having the upper end pivoted to one of the plungers and having the lower end pivoted to an arm 76. The extremities of the arm 76 are provided with annular portions 77, which receive the shaft 60 and are welded or otherwise suitably secured to the latter. The above arrangement is such that the springs 70 cooperate with one another to assist upward movement of the track or arm 23.

It has been previously stated that the shaft 60 is journalled on the sleeve 40 by bearings 61. Each bearing 61 comprises a bottom section 80 welded or otherwise secured to the lower end of the sleeve 40 and a top section 81 welded or otherwise secured to the adjacent spring retainer 71. The two sections cooperate with one another to form a bearing face and a cap 82 is secured to the sections to complete the bearing. In the present instance, the bearing caps 82 and the bearing surfaces of the sections are grooved to form a clearance for the annular end portions 77 of the arms 76.

With the above construction, it will be noted that when it is desired to saw the work W, the operator preferably shifts the carriage 24 to its outermost position on the track 23 adjacent the handle 26. The work W is then positioned on the supporting surface 32 and the track or arm 23 is swung downwardly against the top surface of the work to clamp the latter to the supporting surface 32. The operator may then advance the saw through the work by moving the carriage 24 in a direction toward the clamping device 22. As soon as the saw has passed through the work, the operator swings the track or arm 23 upwardly and, at the same time, retracts the carriage 24. Also, during this phase of the operation, the work may be advanced along the supporting surface, so that when the arm 23 is again lowered, an additional cut may be made by again advancing the carriage toward the clamping device 22. It follows from the above that the arm 23 is, in effect, oscillated about the axis of the shaft 60 to effect successive cutting operations. In some instances, however, it may not be necessary to retract the carriage 24 at the end of each cutting operation. For example, in cases where it is desired to merely cut a length of work into relatively short strips, the carriage 24 is merely reciprocated along the rails 25 of the track so that a cutting operation is effected during each stroke of the carriage. Also, in the event the width of the strips being cut is less than the diameter of the saw 17, it may not even be necessary to move the carriage along the track. In such cases, the carriage may be held stationary in a position to locate the saw directly above the work and successive cutting operations are then effected by merely swinging the track 23 in directions toward and away from the supporting surface 32.

In some cases, it may be desirable to support the arm or track 23 in a position directly opposite the clamping device 22 and this may be accomplished by the construction shown in Figures 8 and 9. In detail, a tubular shaft 90 is journalled on the clamping device 22 in the same manner as the tubular shaft 60 previously described in connection with the first embodiment of this invention. A pair of shafts 91 are respectively telescoped into opposite ends of the shaft 90 and are secured to the latter by means of pins 92. The outer ends of the shafts 91 are bored transversely of the axis of the shaft 90 to form sleeves 93 for respectively receiving the inner ends of the rails 25. The outer sides of the sleeves 93 are formed with longitudinally extending slots 94 and ears 95 are respectively welded or otherwise secured to opposite longitudinal edges of the slots. The ears 95 are formed with aligned openings therethrough for receiving the clamping bolts 96. The purpose of the bolts 96 is to clamp the sleeve portions 93 firmly against the rails 25 and prevent displacement of the latter. The above construction enables centrally locating the arm or track 23 relative to the clamping device 22 and otherwise is the same as the first described form of the invention.

Referring now to the embodiment of the invention shown in Figures 10 and 11, it will be noted that the reference character 97 indicates a tubular shaft journalled on the clamping device 22 in the same manner as the tubular shaft 60 previously described. A second shaft 98 is telescoped within the tubular shaft 97 and is of sufficient length to enable supporting the track or arm 23 on the clamping device 22 directly opposite the latter or on either side of the same. In other words, the shaft 98 is adjustable axially of the shaft 97 and may be secured to the latter in any one of the several adjusted positions by means of a pin 99.

The inner ends of the rails 25 are attachable to the shaft 98 through the medium of brackets 100. One of the brackets is shown in detail in Figure 11 of the drawings and comprises two sleeves 101 and 102. The sleeve 102 is permanently secured to the top of the sleeve 101 with its axis extending at right angles to the axis of the sleeve 101 and is formed with a longitudinally extending slot 103 at one side thereof. Suitable ears 104 are respectively secured to the sleeve 102 at opposite sides of the slot 103 and cooperate with a clamping bolt 105 to contract the sleeve 102. The sleeve 101 is also formed with a longitudinally extending slot 106 at one side thereof and a pair of ears 107 are respectively secured to the sleeve at opposite sides of the slot 106 for cooperation with a clamping bolt 108 to contract the sleeve 101. The sleeve 102 is adapted to receive one of the rails 25 of the track and the sleeve 101 is adapted to telescope the shaft 98. If desired, the sleeve 101 may be provided with an inwardly extending rib 109 along one edge of the slot 106 and this rib may be engaged in a groove 110 formed in the shaft 98 to effect a driving connection between the bracket 100 and the shaft. Inasmuch as the brackets 100 are of identical construction, it will be noted that the elevation of the track or arm 23 may be varied to suit work of different thicknesses by merely rotating the brackets 100 around the axis of the shaft 98. For example, if it is desired to lower the track or arm 23, the brackets 100 are rotated throughout 180° from the positions thereof shown in Figure 11 to locate the sleeves 102 at the underside of the shaft 98.

Thus, from the foregoing, it will be noted that I have provided a relatively simple inexpensive fixture capable of being used in connection with standard, portable, power driven tools. It will further be apparent that the fixture facilitates the operation of the tool or saw thereon and has numerous adjustments which greatly increase the possible uses of the tool.

What I claim as my invention is:

1. A fixture for portable power driven circular saws, comprising a vertical support attachable to a work supporting surface, an elongated track extending from the vertical support and adapted to rest on the top of a work piece positioned on the supporting surface to clamp the work piece on the supporting surface, a pivotal connection between the vertical support and adjacent end of the track arranged to permit vertical swinging movement of the track relative to the work supporting surface, means for varying the elevation of the pivotal connection relative to the work supporting surface to compensate for work pieces of different thicknesses, and a carriage supported on the track for sliding movement over the work piece and having provision for supporting a power driven circular saw.

2. A fixture for portable power driven circular saws, comprising a vertical support adapted to be positioned on a work supporting surface and having a part mounted on the support for sliding movement in the direction of length of the support, an elongated track extending from the support and adapted to rest on the top surface of a work piece positioned on the supporting surface to clamp the work piece on the supporting surface, a pivotal connection between the part aforesaid of the support and adjacent end of the track permitting vertical swinging movement of the free end of the track, means for securing said part to the support in different vertical positions to vary the elevation of the track relative to the supporting surface, and a carriage supported on the track for sliding movement over the work piece and having provision for supporting a power driven circular saw.

3. A fixture for portable power driven circular saws, comprising a supporting post adapted to extend vertically from a work supporting surface, a part mounted on the post for both rotation and sliding movement relative to the post, an elongated track extending from the post and adapted to rest on the top surface of a work piece positioned on the supporting surface, a pivotal connection between said part and adjacent end of the track permitting vertical swinging movement of the free end of the track, independently operable means for selectively securing the part to the post in different vertical positions to vary the elevation of the track relative to the supporting surface and in different angular positions relative to the supporting surface, and a carriage supported on the track for sliding movement over the work piece and having provision for supporting a power driven circular saw.

4. A fixture for portable power driven circular saws, comprising a supporting post adapted to extend vertically from a work supporting surface, a part mounted on the post for both rotation and sliding movement relative to the post, an elongated track extending from the post and adapted to rest on the top surface of a work piece positioned on the supporting surface, a pivotal connection between said part and adjacent end of the track permitting vertical swinging movement of the free end of the track, independently operable means for selectively securing the part to the post in different vertical positions and in different angular positions relative to the supporting surface, a carriage supported on the track for sliding movement along the track over the work piece and having provision for supporting a power driven circular saw, and means associated with the end of the track adjacent said post for yieldably urging the track in an upward direction.

5. A fixture for portable power driven circular saws, comprising a supporting post adapted to extend vertically from a work supporting surface, a part mounted on the post for both rotation and sliding movement relative to the post, means for clamping a work piece to the supporting surface including a track having laterally spaced side rails adapted to rest on the top surface of a work piece on the supporting surface, a cross member extending between the ends of the rails adjacent said part, a bearing secured to said part with its axis extending transversely of the path of vertical movement of the part and forming a journal for the cross member on the track permitting vertical swinging movement of the free end of the track, independently operable means for selectively clamping said part to the post in different vertical positions and in different angular positions relative to the supporting surface, and a carriage supported on the track for sliding movement along the track over the work piece and having provision for supporting a power driven circular saw.

6. A fixture for portable power driven circular saws, comprising a supporting post adapted to extend vertically from a work supporting surface, a part mounted on the post for both rotation and sliding movement relative to the post, a track extending from the post and having laterally spaced rails adapted to rest on the top surface of a work piece on the supporting surface, a cross member connecting the ends of the rails adjacent the post, means supporting the cross member on said part permitting vertical swinging movement of the free end of the track relative to the supporting surface, independently operable means for selectively clamping the part to the post in different vertical positions and in different angular positions relative to the supporting surface, a carriage having portions extending between the rails at an elevation above a plane including the bottom surfaces of the rails and adapted to support a power driven circular saw, extensions at opposite ends of said carriage portions positioned to rest on the top surfaces of the rails and shaped to cooperate with the rails to guide the carriage along the track, and means for swinging the free end of the track in an upward direction.

7. A fixture for portable power driven circular saws, comprising a support adapted to extend vertically from a work supporting surface, a track extending from the vertical support in substantially parallel relation to the supporting surface and having laterally spaced side rails adapted to rest on the top surface of a work piece on the supporting surface, a cross member connecting the ends of the rails adjacent the support, means supporting the cross member on the support permitting vertical swinging movement of the free end of the track relative to the supporting surface, a carriage having end members extending transversely of the rails between the latter at an elevation above a plane including the bottom surfaces of the rails and having flanges respectively engageable by opposite ends of a base plate supporting a power driven circular saw, means for connecting the transverse members adjustable to compensate for saw bases of different length, and extensions at opposite ends of the members arranged to extend over the top surfaces of the rails and shaped to cooperate with the rails to guide the carriage along the track.

8. A fixture for portable power driven circular saws having a base plate, comprising a vertical support adapted to be positioned on a work supporting surface, a track adapted to extend from the support over the work supporting surface and having laterally spaced rails, a pivotal connection between the vertical support and adjacent end of the track permitting vertical swinging movement of the track relative to the work supporting surface, a carriage having end members extending transversely of the track in spaced relationship lengthwise of the rails and having flanges on said members extending between the rails at an elevation between parallel planes respectively including the top and bottom surfaces of the rails to provide supports on which opposite ends of the base plate of a power driven circular saw is adapted to be positioned, means at opposite ends of the members respectively resting on the top surfaces of the rails and cooperating with the latter to guide the carriage along the track, and means respectively connecting opposite ends of the members adjustable to vary the spacing between the members and thereby compensate for saw base plates of different lengths.

9. A fixture for portable power driven circular saws, comprising a clamp attachable to a work supporting surface, a part supported by the clamp for rotative movement about a generally vertical axis and for sliding movement along said axis, means for clamping a work piece to be sawed on the supporting surface including an elongated track having a free end and having the opposite end supported on said part for swinging movement about an axis substantially normal to the axis of rotative movement of the part, independently operable means for securing said part at different elevations relative to the supporting surface and in different angular positions about said vertical axis, and a saw supporting carriage supported on the track for sliding movement lengthwise of said track.

10. The fixture set forth in claim 9 in which means is provided for selectively pivotally mounting the track on the clamp in generally symmetrical relation to the vertical axis or to one side of said axis.

MARVIN W. COLEMAN.

REFERENCES CITED

The following references are of record in the file of this patent:

UNITED STATES PATENTS

| Number | Name | Date |
|---|---|---|
| 422,332 | Bronson | Feb. 25, 1890 |
| 898,067 | Russell | Sept. 8, 1908 |
| 1,529,303 | Drucker | Mar. 10, 1925 |
| 1,550,520 | Drucker | Aug. 18, 1925 |
| 1,638,122 | Jull | Aug. 9, 1927 |
| 1,828,043 | Hedgpeth | Oct. 20, 1931 |
| 1,832,283 | Earhart | Nov. 17, 1931 |
| 1,850,773 | Rueger | Mar. 22, 1932 |
| 1,865,759 | Hughes | July 5, 1932 |
| 2,396,961 | Meredith | Mar. 19, 1946 |